(12) United States Patent
Kim

(10) Patent No.: US 8,370,662 B2
(45) Date of Patent: Feb. 5, 2013

(54) APPARATUS AND METHOD FOR POWER SAVING OF BUS INTERFACE IN PORTABLE TERMINAL

(75) Inventor: Jong-Yol Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 462 days.

(21) Appl. No.: 12/687,948

(22) Filed: Jan. 15, 2010

(65) Prior Publication Data

US 2010/0180134 A1  Jul. 15, 2010

(30) Foreign Application Priority Data

Jan. 15, 2009  (KR) .................. 10-2009-0003208

(51) Int. Cl.
  *G06F 1/00*   (2006.01)
  *G06F 3/00*   (2006.01)
  *G06F 13/14*  (2006.01)
  *H04B 1/38*   (2006.01)

(52) U.S. Cl. ........ 713/322; 713/320; 375/222; 455/557; 455/574; 710/18; 710/305

(58) Field of Classification Search .................. 713/320, 713/322; 710/18, 305; 455/557, 574; 375/222
See application file for complete search history.

(56) References Cited

U.S. PATENT DOCUMENTS

| | | | |
|---|---|---|---|
| 6,185,692 B1 * | 2/2001 | Wolford ..................... | 713/501 |
| 7,392,411 B2 * | 6/2008 | Shakkarwar ................ | 713/320 |
| 7,489,109 B1 * | 2/2009 | Qian et al. ................. | 320/135 |
| 7,606,960 B2 * | 10/2009 | Munguia .................... | 710/307 |
| 7,725,759 B2 * | 5/2010 | Henson ...................... | 713/600 |
| 7,826,866 B2 * | 11/2010 | Yellin et al. ................ | 455/553.1 |
| 8,125,490 B1 * | 2/2012 | Vaidya et al. ............... | 345/520 |

* cited by examiner

*Primary Examiner* — Stefan Stoynov

(74) *Attorney, Agent, or Firm* — Cha & Reiter, LLC

(57) ABSTRACT

An apparatus and a method for power saving in a portable terminal are provided. The method for power saving in the portable terminal includes determining a throughput when processed by a bus, determining a throughput required for a program and selectively controlling a bus clock connected with a modem according to the determined throughput.

18 Claims, 4 Drawing Sheets

```
typedef enum
{
    SDCC_MCLK_144KHZ = 0,      // In case, VoIP
    SDCC_MCLK_400KHZ = 1,
    SDCC_MCLK_8MHZ   = 2,
    SDCC_MCLK_16MHZ  = 3,
    SDCC_MCLK_17MHZ  = 4,
    SDCC_MCLK_20MHZ  = 5,      // In case, messaging
    SDCC_MCLK_25MHZ  = 6,
    SDCC_MCLK_32MHZ  = 7,      // In case, Web Browsing
    SDCC_MCLK_40MHZ  = 8,
    SDCC_MCLK_50MHZ  = 9,      // In case, FTP download
}SDCC_MCLK_INDEX;
```

FIG.4

APPARATUS AND METHOD FOR POWER SAVING OF BUS INTERFACE IN PORTABLE TERMINAL

CLAIM OF PRIORITY

This application claims the benefit to an earlier Korean patent application filed in the Korean Intellectual Property Office on Jan. 15, 2009 and assigned Serial No. 10-2009-0003208, the entire disclosure of which is hereby incorporated by reference.

BACKGROUND OF THE INVENTION

1. Field of the Invention

The present invention relates to an apparatus and a method for saving a power consumption of a bus interface, by controlling a throughput according to application types of a portable terminal.

2. Description of the Related Art

In a portable terminal, an operating clock of a bus interface between a communication modem and a Central Processing Unit (CPU) is fixed at maximum clock.

In this case, when the operating clock is fixed in order to achieve a maximum throughput, there are drawbacks because the power consumption is greater even if some application programs operating under very low throughput.

Also, the fixed clock reduces operating time of the portable terminal for a user.

Therefore, there is a need to improve power consumption in the portable terminal.

SUMMARY OF THE INVENTION

An aspect of the present invention is to address at least the above-mentioned problems and/or disadvantages and to provide additional advantages described below. Accordingly, an aspect of the present invention is to provide an apparatus and a method for providing a power saving of bus interface in the portable terminal.

Another aspect of the present invention is to provide an apparatus and a method for providing a power consumption by controlling an operation clock of Secure Digital Input Output (SDIO) by selectively controlling the supply voltage in the portable terminal.

In accordance with an aspect of the present invention, a method for saving a power consumption in a portable terminal includes determining a throughput when processed by a bus, determining a throughput required for a program and controlling a bus clock coupled to a modem according to the determined throughput.

In accordance with another aspect of the present invention, an apparatus for saving a power consumption in a portable terminal includes a modem for communicating with other nodes, and a power controller for coupled to the modem using a bus, for determining a throughput when processed by the bus, for determining a throughput required for a program, and for controlling a bus clock coupled to a modem according to the determined throughput.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent to those skilled in the art from the following detailed description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. For the purposes of simplicity and to avoid redundancy, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an apparatus and a method for saving power of bus interface in portable terminal will be explained.

According to the teachings of the present invention, a portable terminal will save its battery power consumption by controlling an operation clock of a SD bus connected to a controller based on consideration of a throughput status of a modem.

Regarding the battery power consumption, functional blocks that are related to a bus interface and coupled to the controller re be considered in addition to the controller itself.

In the embodiment, a SD Input/Output (SDIO) denotes an interface with the controller which is connected with a communication modem. An operation clock of the SDIO may be controlled by controlling a voltage applied to the SDIO.

That is, a throughput varies according to the operation clock of the SDIO, and power consumption may vary according to a selective control of voltage supplied during the operation clock of the SDIO.

Figure 1:
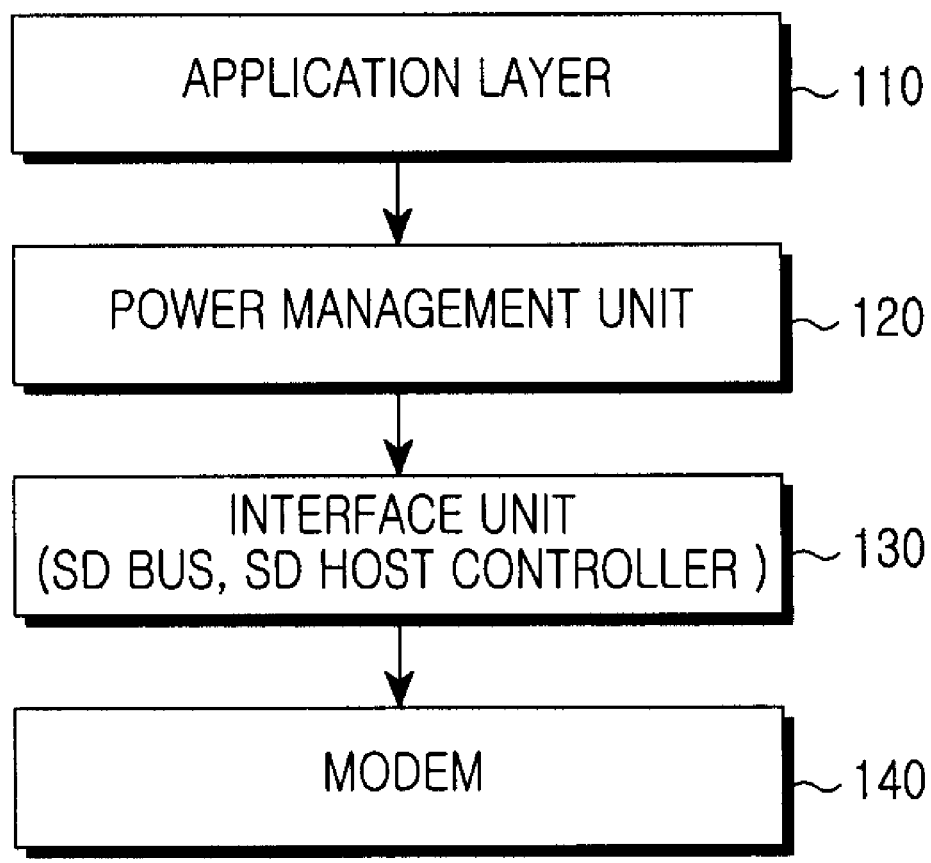
FIG. 1 illustrates a layer model of a portable terminal according to an exemplary embodiment of the present invention.

FIG. 1 illustrates a layer model of a portable terminal according to an exemplary embodiment of the present invention.

Referring to FIG. 1, an application layer 110 denotes an application program that executed in the portable terminal. A required throughput varies according to the application program type, i.e., a Quality of Service (QoS) type which is required for the application program type.

A power management unit 120 locates between an interface unit 130 and the application layer 110 and determines a throughput which is required from an application program being executed in the portable terminal. The power management unit 120 controls the interface unit 130 based on the throughput. That is, the power management unit 120 controls an operation clock of the interface unit 130 by controlling a voltage being applied to the interface unit 130.

The interface unit 130 (especially, SD host controller) receives the voltage from the power management 120 and determines an operation clock of SDIO (an operation clock of SD bus) according to the voltage supplied from the power management unit 120.

A modem 140 denotes a communication modem and operates as an interface for the portable terminal to communicate with external nodes.

The power management unit 120 determines a throughput required for data transmission/reception according to the application program type, as illustrated in FIG. 4.

In operation, when a portable terminal is executing an application program such as downloading a file through the modem 140, the portable terminal maximizes the operation clock of the SDIO in order to maximize the throughput.

On the other hand, when the portable terminal is executing a program that is not sensitive to the throughput such as a VoIP application program, the portable terminal minimizes the operation clock of the SDIO in order to minimize the throughput.

That is, when the program which requires the maximum throughput is executing, the portable terminal maintains a high clock in order to minimize user's inconvenience. When the program which requires relatively a low throughput is executing, the portable terminal maintains a low clock in order to reduce its power consumption.

The power management 120 recognizes instantly the throughput related to the application program so that the power management 120 selectively controls the operation clock according to the throughput.

Furthermore, when a battery level of the portable terminal is extremely low, the power management unit 120 recognizes the battery level and minimizes a SDIO clock.

As a result, when the battery level is extremely low, an available communication time of the portable terminal may be extended even if the throughput is low.

Figure 2:
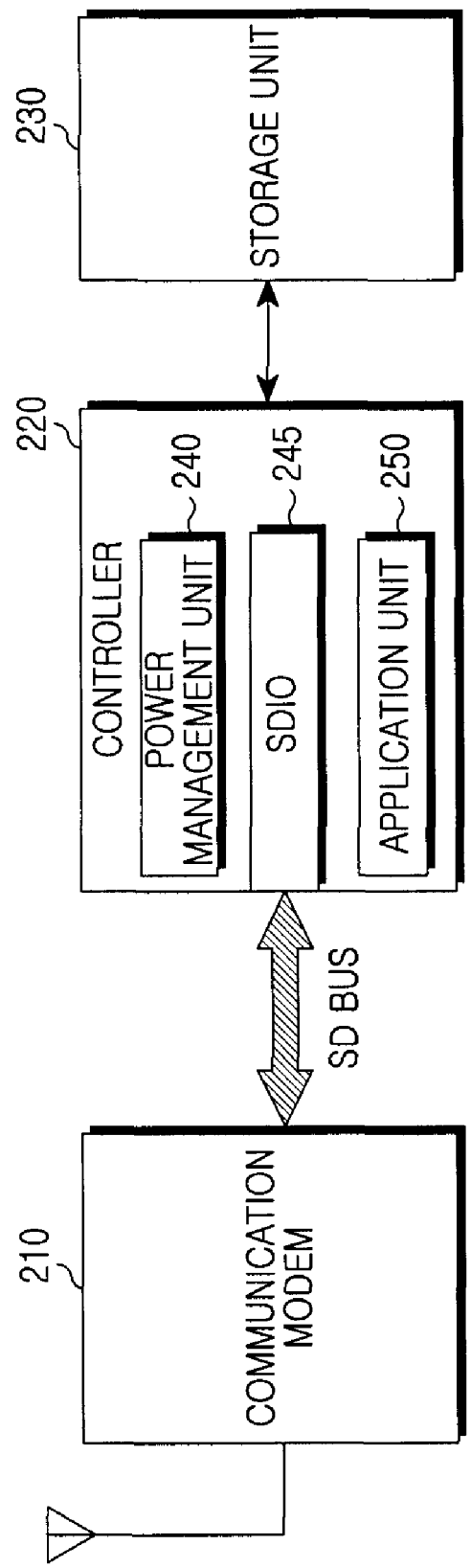
FIG. 2 illustrates a block diagram of a portable terminal according to an exemplary embodiment of the present invention

FIG. 2 illustrates a block diagram of a portable terminal according to an exemplary embodiment of the present invention.

Referring to FIG. 2, the portable terminal includes a communication modem 210, a controller 220, a storage unit 230, a power management unit 240, a SDIO 245, and an application unit 250. Herein, the power management unit 240 and the application unit 250 may be implemented as a software unit respectively, and the controller 220 comprises a power management unit 240, a SDIO 245 and an application unit 250.

The communication modem 210 communicates with other nodes and comprises a wireless processor (not shown) and a baseband processor (not shown). The wireless processor converts a signal received over an antenna to a baseband signal and outputs the baseband signal to the baseband processor.

Also, the wireless processor converts a baseband signal output from the baseband processor to a radio signal transmittable over the air and transmits the radio signal via the antenna.

The controller 220 controls overall operations of the portable terminal. Herein, the controller 220 controls the power management unit 230 and the application unit 250.

The storage unit 230 stores programs for controlling the operations of the portable terminal, and data temporarily generated through the program execution. Herein, the storage unit 230 stores application programs according to the present invention and throughputs which are required from the application programs.

The SDIO 245 s provided between the controller 220 and the communication modem 210 and its function is previously explained with reference to FIG. 1. That is, the SDIO 245 controls a SDIO clock according to a voltage supplied from the power management unit 240.

In the embodiment, the power management unit 240 determines application program types which is currently executing and determines data transmission throughput required for corresponding application program.

For example, when the portable terminal is executing an application program which is downloading a file through the communication modem 210, the portable terminal maximizes the operation clock of the SDIO in order to maximize the throughput.

On the other hand, when the portable terminal is executing an application program not to be sensitive to the throughput such as a VoIP application program, the portable terminal minimizes the operation clock of the SDIO in order to minimize the throughput.

The power management unit 240 recognizes instantly the throughput related to the application program so that the power management unit 240 can selectively control the operation clock according to the throughput.

Furthermore, when a battery level of the portable terminal is extremely low, the power management unit 240 recognizes the battery level and minimizes a SDIO clock. Thus, when the battery level is extremely low, an available communication time of the portable terminal may be extended even if the throughput is low.

As constructed above, the controller 220 may serve as the power management unit 240 and the application unit 250. Herein, they are separately illustrated to distinguish their functions. In an alternate embodiment, the controller 220 may process all or part of the functions of the power management unit 240 and the application unit 250.

Figure 3:
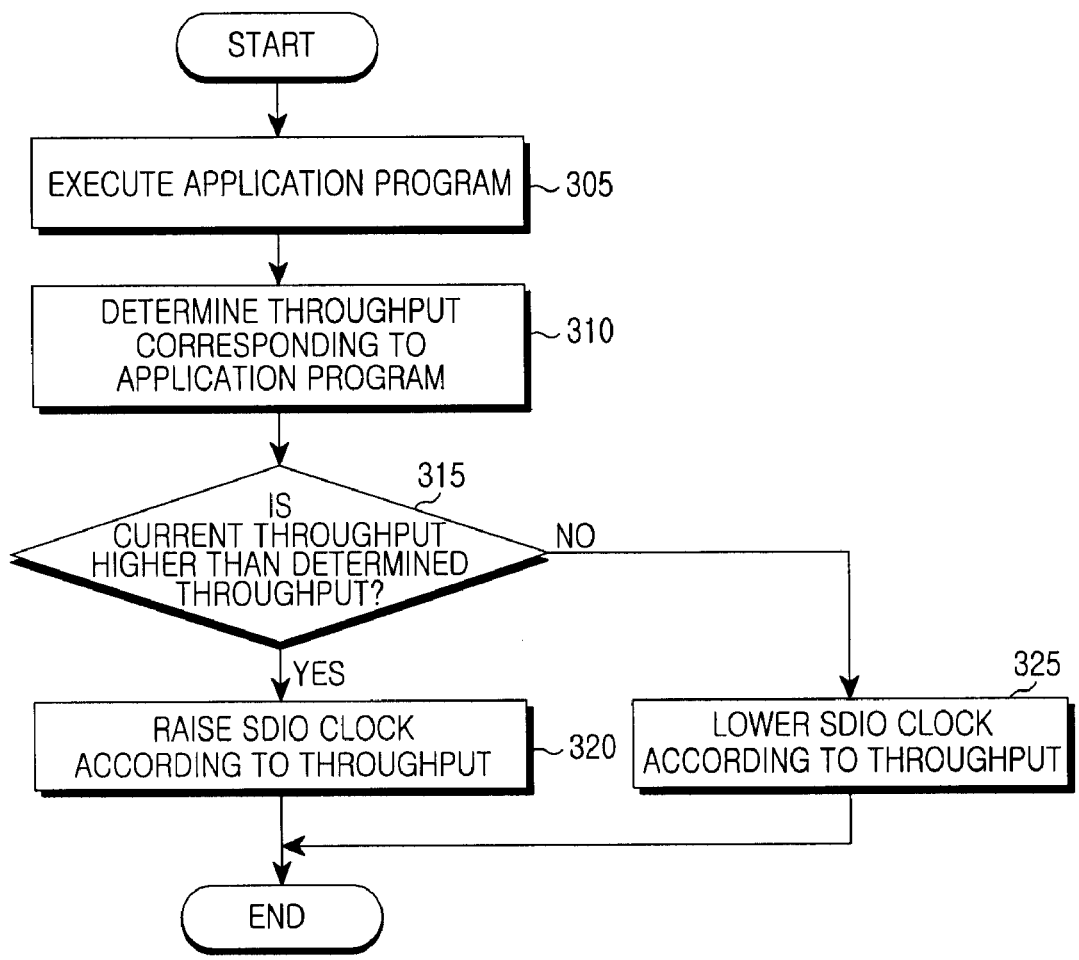
FIG. 3 illustrates an operation procedure of a portable terminal according to an exemplary embodiment of the present invention; and, FIG. 4 illustrates a clock speed in an application program according to an exemplary embodiment of the present invention.

FIG. 3 illustrates an operation procedure of a portable terminal according to an exemplary embodiment of the present invention.

Referring to FIG. 3, when an application program is executing in step 305, a power management unit determines a throughput corresponding to the application program in step 310. Then, the power management unit controls the voltage applied to a SDIO clock according to the throughput.

That is, when a current throughput is higher than the determined throughput in step 315, the power management unit raises the SDIO clock according to the determined throughput in step 320. When a current throughput is lower than the determined throughput in step 315, the power management unit lowers the SDIO clock according to the determined throughput in step 325. The teachings of the present invention can be illustrated and readily more apparent those skilled in the art, as explained in term of algorithm hereinafter.

When that the portable terminal has a PDA controller and a modem controller together and they are connected with a SDIO bus, a battery power consumption of the portable terminal may be described as following equation 1.

Battery Power Consumption when an application program is executing (4)=PDA controller Power Consumption (1)+SDIO block Power Consumption in the PDA controller (2)+Modem Controller Power Consumption (3).

Here, when a clock control in the controller is only considered, a clock is higher than the necessary clock is applied to the SDIO block. Thus, the SDIO block Power Consumption in the PDA controller (2) may be wasted.

In other words, the (2) may be operating with a high clock under a condition that the (1), and the (3) may be operating under low power consumption mode. Thus, Power waste occurs.

However, when an operation clock of the SDIO block is considered as in the present invention, determination of optimal clock in view of executing application programs and a status of mode controller is applied to the SDIO block, the power consumption can be reduced.

In other words, the (2) may be controlled to be operating with a low clock under a condition that the (1), and the (3) may be operating under low power consumption mode. Thus, power consumption may be reduced.

FIG. 4 illustrates a clock speed in an application program according to an exemplary embodiment of the present invention.

Referring to FIG. 4, clocks required for programs are listed. It is required for Voice Over IP (VoIP) program to have 144 KHz, 20 MHz for messaging program, 32 MHz for Web Browsing program, and 50 MHz for FTP program.

Therefore, the present invention has an advantage of saving power by optimizing the power consumption of SD host controller which interfaces with a communication modem.

Also, the present invention may provide an optimal performance to a user and minimize the power consumption in a real time manner, thus maximizing an operating time of the portable terminal for a user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for power saving in a portable terminal:
   determining a throughput when processed by a bus;
   determining a throughput required for a program; and,
   selectively controlling a level of voltage applied to a bus clock interface coupled to a modem via the bus in order to control a bus clock according to the determined throughput.

2. The method of claim 1, further comprising reducing the voltage level applied to the bus clock interface by a predetermined amount when a battery level of the portable terminal is lower than a threshold.

3. The method of claim 1, wherein the controlling comprises lowering the voltage level to correspond with the determined throughput, which is higher than the throughput required for the program.

4. The method of claim 1 wherein the controlling step is raising the voltage level to correspond with the determined throughput, which is lower than the throughput required for the program.

5. The method of claim 1, wherein the step of determining the throughput required for the program comprises determining the throughput required for the program based on a relation between application programs and corresponding throughputs.

6. The method of claim 1, wherein the bus is a Secure Digital (SD) bus.

7. An apparatus for providing power saving in a portable terminal, comprising:
   a modem for communicating with other nodes; and,
   a power controller coupled to the modem using a bus for determining a throughput when processed by the bus, for determining a throughput required for a program and for selectively controlling a level of voltage of a bus clock interface connected with the modem in order to control a bus clock according to the determined throughput.

8. The apparatus of claim 7, wherein the power controller reducing a voltage supplied to the bus clock interface coupled to the modem by a predetermined amount when a battery level of the portable terminal is lower than a threshold.

9. The apparatus of claim 7, wherein the power controller lowers the level of voltage when the determined throughput is higher than the throughput required for the program.

10. The apparatus of claim 7, wherein the power controller raises the voltage level when the determined throughput is lower than the throughput required for the program.

11. The apparatus of claim 7, wherein the determined throughput required for the program is based on a relation between application programs and corresponding throughputs.

12. The apparatus of claim 7, wherein the bus is a Secure Digital (SD) bus.

13. A non-transitory computer-readable recording medium having recorded thereon an application program for power saving in a portable terminal, comprising;
   a first code segment for determining a throughput when processed by a bus;
   a second code segment for determining a throughput required for a program; and,
   a third code segment for selectively controlling a level of voltage applied to a bus clock interface coupled to a modem via the bus in order to control a bus clock according to the determined throughput.

14. The non-transitory computer-readable recording medium of claim 13, further comprising;
   a fourth code segment for reducing the voltage level applied to the bus clock interface by a predetermined amount when a battery level of the portable terminal is lower than a threshold.

15. The non-transitory computer-readable recording medium of claim 13, wherein the controlling comprises lowering the voltage level to correspond with the determined throughput, which is higher than the throughput required for the program.

16. The non-transitory computer-readable recording medium of claim 13, wherein the controlling step is raising the voltage level to correspond with the determined throughput, which is lower than the throughput required for the program.

17. The non-transitory computer-readable recording medium of claim 13, wherein the second code segment comprises determining the throughput required for the program based on a relation between application programs and corresponding throughputs.

18. The non-transitory computer-readable recording medium of claim 13, wherein the bus is a Secure Digital (SD) bus.

* * * * *